United States Patent
Brauner et al.

(10) Patent No.: US 11,148,531 B2
(45) Date of Patent: Oct. 19, 2021

(54) CONFIGURABLE VEHICLE POWER OUTLET SYSTEM

(71) Applicant: Ford Global Technologies, LLC, Dearborn, MI (US)

(72) Inventors: Jacek Brauner, Plymouth, MI (US); Theodore Joseph Filippi, Brownstown, MI (US); Allan Roy Gale, Livonia, MI (US); Ke Zou, Canton, MI (US); Krishna Prasad Bhat, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 16/160,279

(22) Filed: Oct. 15, 2018

(65) Prior Publication Data

US 2020/0114765 A1 Apr. 16, 2020

(51) Int. Cl.
*B60L 1/00* (2006.01)
*H01R 27/02* (2006.01)

(52) U.S. Cl.
CPC .............. *B60L 1/006* (2013.01); *H01R 27/02* (2013.01)

(58) Field of Classification Search
CPC ......... B60L 1/006; B60L 53/16; H01R 27/02; H01R 31/06; H01R 31/065; H01R 27/00; H01R 13/665; H01R 13/70; H01R 2201/26; Y02T 90/14; Y02T 10/7072; Y02T 10/70; Y02T 90/16; B60R 16/03
See application file for complete search history.

(56) References Cited

U.S. PATENT DOCUMENTS

| 2011/0204712 A1* | 8/2011 | Tarasinski | ............ A01B 59/06 307/9.1 |
| 2015/0274323 A1* | 10/2015 | Loignon | ................. B60L 1/006 180/53.5 |
| 2018/0097452 A1 | 4/2018 | Chapman et al. | |

FOREIGN PATENT DOCUMENTS

CN 203070010 U 7/2013

\* cited by examiner

*Primary Examiner* — Hal Kaplan
*Assistant Examiner* — Thai H Tran
(74) *Attorney, Agent, or Firm* — David B. Kelley; Brooks Kushman P.C.

(57) ABSTRACT

A vehicle includes a pair of power converters. The vehicle includes a socket having an array of power terminals arranged to accept outlets of different power terminal configurations to interconnect the pair therewith. The vehicle includes a panel having an outlet engaged with the socket. The panel includes a controller configured to communicate an electrical rating of the outlet via the socket to define a switching scheme for the pair. The communication is responsive to detecting panel and socket engagement.

18 Claims, 5 Drawing Sheets

CONFIGURABLE VEHICLE POWER OUTLET SYSTEM

TECHNICAL FIELD

The present disclosure relates to the configuration of vehicle power outlets.

BACKGROUND

Vehicles may provide electrification capabilities to internal or external devices through outlets having predetermined ratings and electrical provisions. As such, outlets may only be able to power certain types of devices or a limited number of devices at a time.

SUMMARY

A vehicle includes a pair of power converters. The vehicle includes a socket having an array of power terminals arranged to accept outlets of different power terminal configurations to interconnect the pair therewith. The vehicle includes a panel having an outlet engaged with the socket. The panel includes a controller configured to communicate an electrical rating of the outlet via the socket to define a switching scheme for the pair. The communication is responsive to detecting panel and socket engagement.

A vehicle includes a socket having an array of power terminals arranged to accept outlets of different power terminal configurations to interconnect power converters therewith. The vehicle includes a panel having an outlet engaged with the socket. The vehicle includes a controller configured to operate the power converters commensurate with a load of the outlet such that the load is satisfied with one of the power converters providing more power than the other of the power converters. The operation is responsive to detecting engagement of the panel and power converters.

A vehicle includes at least one power converter. The vehicle includes a socket having an array of power terminals arranged to accept outlets of different power terminal configurations to interconnect the at least one power converter therewith. The vehicle includes a panel having an outlet engaged with the socket. The vehicle includes a controller configured to communicate an electrical rating of the outlet such that the at least one power converter satisfies a load connected to the outlet. The communication is responsive to detecting engagement of the panel and socket,

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Any type of vehicle, including boats, trains, drones, and cars may include a microgrid. The microgrid or other systems may provide power to sockets of a vehicle for consumption by user devices and systems. The sockets may be configured to receive plug and play outlets that have intrinsic or adjustable electrical ratings. For example, the outlets may be configured to provide alternating current (AC) or direct current (DC) based on preconfiguration of the outlet panel. The outlets may be capable of increasing received current or voltage from the sockets such that the output meets the requirements of a load. Indeed, outlets may be swapped upon demand and configured to provide demanded power to user devices such that plug and play operation is achieved.

Figure 1:
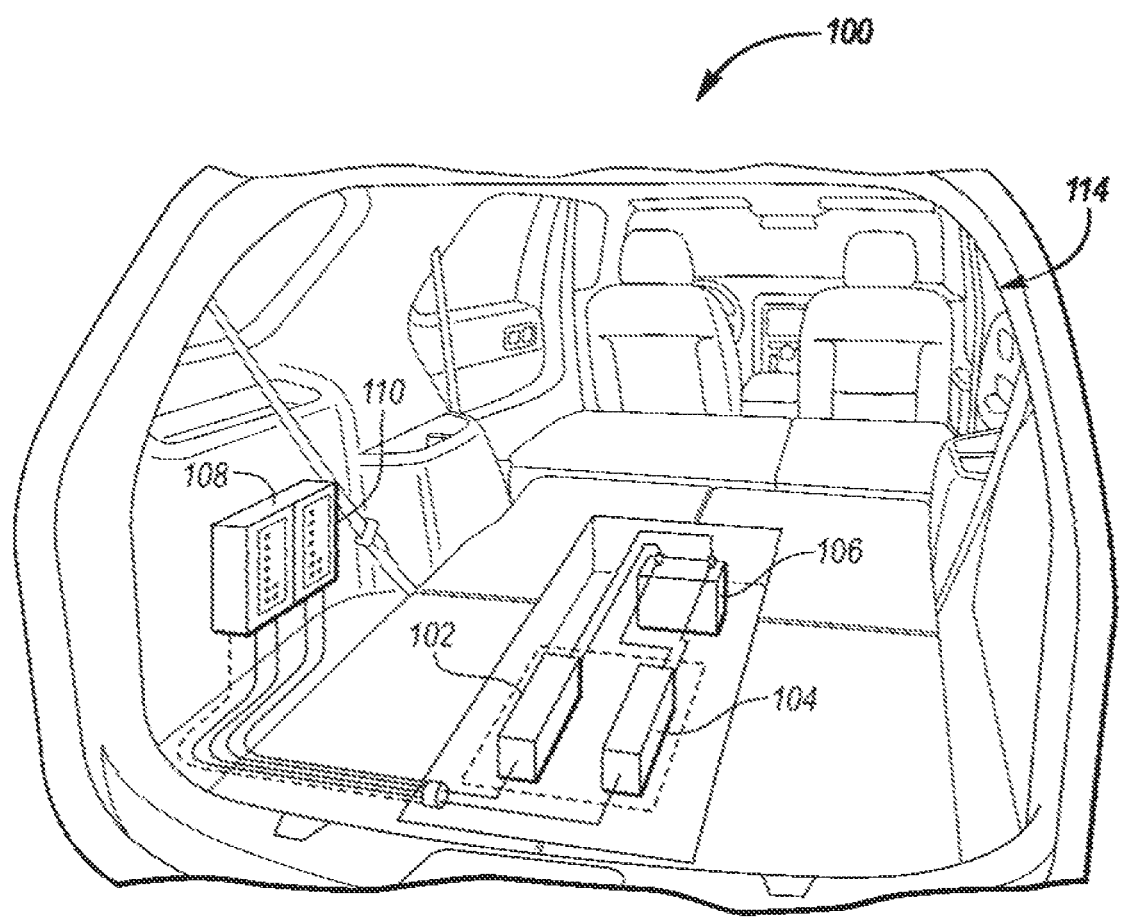
FIG. 1 is a perspective view of a vehicle cargo hold.

Referring to FIG. 1, a vehicle 100 is shown. Although depicted as a sport utility vehicle, any type of vehicle may be used. For example, cars, trucks, boats, planes, helicopters, and drones may include the teachings of this disclosure. The vehicle 100 may be an electric vehicle, hybrid-electric vehicle, battery-electric vehicle, internal combustion vehicle, or having other types of propulsion. The vehicle 100 includes a cargo hold 114. The cargo hold 114 or another internal or external area of the vehicle 100 may provide access to sockets 108, 110. The sockets 108, 110 may be electrically and communicatively connected to power converters 102, 104. The converters 102, 104 may underlie the cargo area or be situated near other vehicle systems located in other areas of the vehicle (e.g., engine compartment). Additionally, the converters 102, 104 may be duel purposed inverters associated with electric machines or integrated starter motors. The converters 102, 104 may be otherwise associated with high-voltage or low-voltage busses configured to power main and auxiliary power systems. The converters 102, 104 may be connected with a battery 106. The battery 106 may be a traction battery or an auxiliary battery of the vehicle 100. The battery 106 may be an individual battery cell or collection of battery cells.

Figure 2:
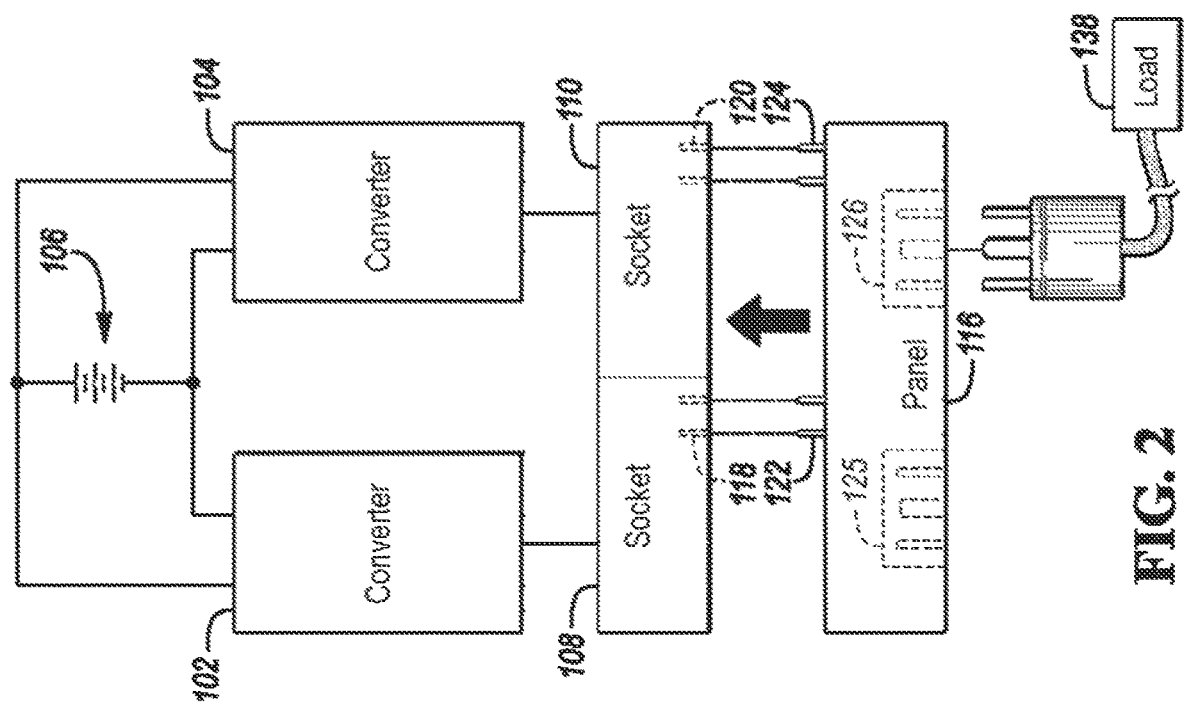
FIG. 2 is an overhead schematic of a vehicle power outlet system.

Referring to FIG. 2, an overhead schematic is shown. The schematic includes the battery 106 electrically connected to converters 102, 104. The converters 102, 104 are electrically and communicatively connected to the sockets 108, 110. The sockets 108, 110 include an array of power terminals 118, 120 for receiving power terminals 122, 124 of the panel 116. The panel 116 may include outlets 125, 126 configured to provide electricity to loads 138. As shown, the panel 116 is configured to be removably attached to the sockets 118, 120. The panel 116 may be configured to attach to any number of sockets 118, 120. That is, the panel 116 may be configured to electrically engage only one of the sockets 118, 120 or additional sockets.

Figure 3:
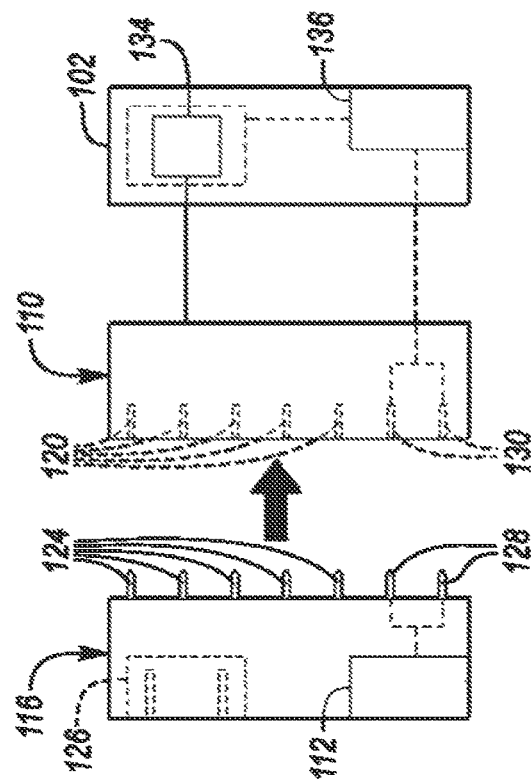
FIG. 3 is a side schematic of a vehicle power outlet system.

Now referring to FIG. 3, a sideview schematic is shown. The schematic similarly includes the converter 102, socket 110, and removably configured panel 116. As further shown from the side view the socket 110 and panel 116 include an of power terminals 118, 120, 122, 124. It should be appreciated that the power terminals are configured to provide any type of power. The power terminals 118, 120, 122, 124 may include leads for different phases from the converters 102, 104 to connect therewith. The power terminals may include three-phase leads from one of the converters 102, 104. The array may include neutral and ground leads. As should be appreciated, the converters 102, 104 may be three-phase inverters. That is, the converters 102, 104 may supply independent three-phase or multiphase power to different outlets 124, 125 of the panel 116. The outlets 124, 125 may be configured to conduct any type of power supplied. For example, the outlets 124, 125 may have universal ports configured to connect to any standard plug configuration. Further, the outlets 124, 125 may include additional connections for hot-wiring or direct wiring. A controller 136 of the converters 102, 104 may drive switches 134 of the converter 102, 104 to provide a desired electrical output or rating. Additionally, the controller 136 may provide power factor, current, and voltage correction to properly supply loads 138 attached to the outlets 125, 126.

The panel 116 may include a controller 112 in communication with the communications terminals 128. The controller 112 may be configured to communicate via various communications methods and protocols (e.g., CAN, UART, TCP/IP). The communications terminals 128, 130 may communicate electrical ratings and settings to a controller 136 of the converters 102, 104. The electrical ratings may include the current type required (i.e., AC, DC). The electrical ratings may include the voltage, current, power, or other electrical characteristics required. The ratings may include electrical requirements. The ratings may be based on Nation Electric Code Articles (e.g., 445, 625). The voltage rating of the outlet and the voltage characteristics as set by pertinent standards may be included. The electrical ratings may specify the number of converters to be used. As such, the electrical rating may specify any electrical or non-electrical characteristic necessary to fulfill power required by loads attached to the outlet 125, 126.

The electrical ratings may further suggest the lead lines to supply with power. For example, the electrical ratings may specify that two-phase power is required and that the hot lead lines should be $L_2$ and $L_3$. The electrical ratings may specify that three-phase power is required and that the hot lead lines should be $L_1$ and $L_2$. The electrical ratings may specify any necessary characteristics to ensure proper function of the system. It should be appreciated that any number or combination of controllers 112, 136 may be used. A single controller may be used located at either the outlet 124, 125 or the converters 102, 104. Further, the controllers 112, 136 may be located offboard the system and located on a controller of the vehicle (not shown). Additionally, the converters 102, 104 may be any type of power transformer or power providing apparatus. The converters 102, 104 may be transformers, inverters, DC-DC converters, buck converters, boost converters, voltage regulators, or other types of devices configured to alter current and voltage of the source.

Figure 4A:
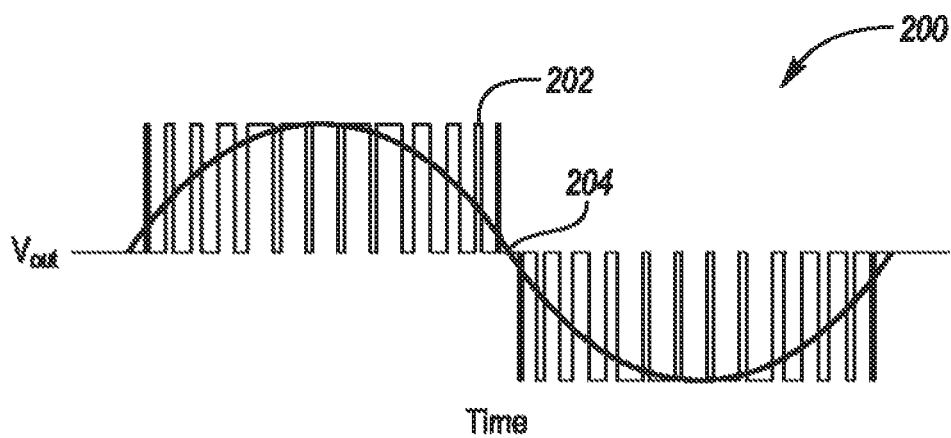
FIG. 4A depicts a pulse width modulation scheme for alternating current.
Figure 4B:
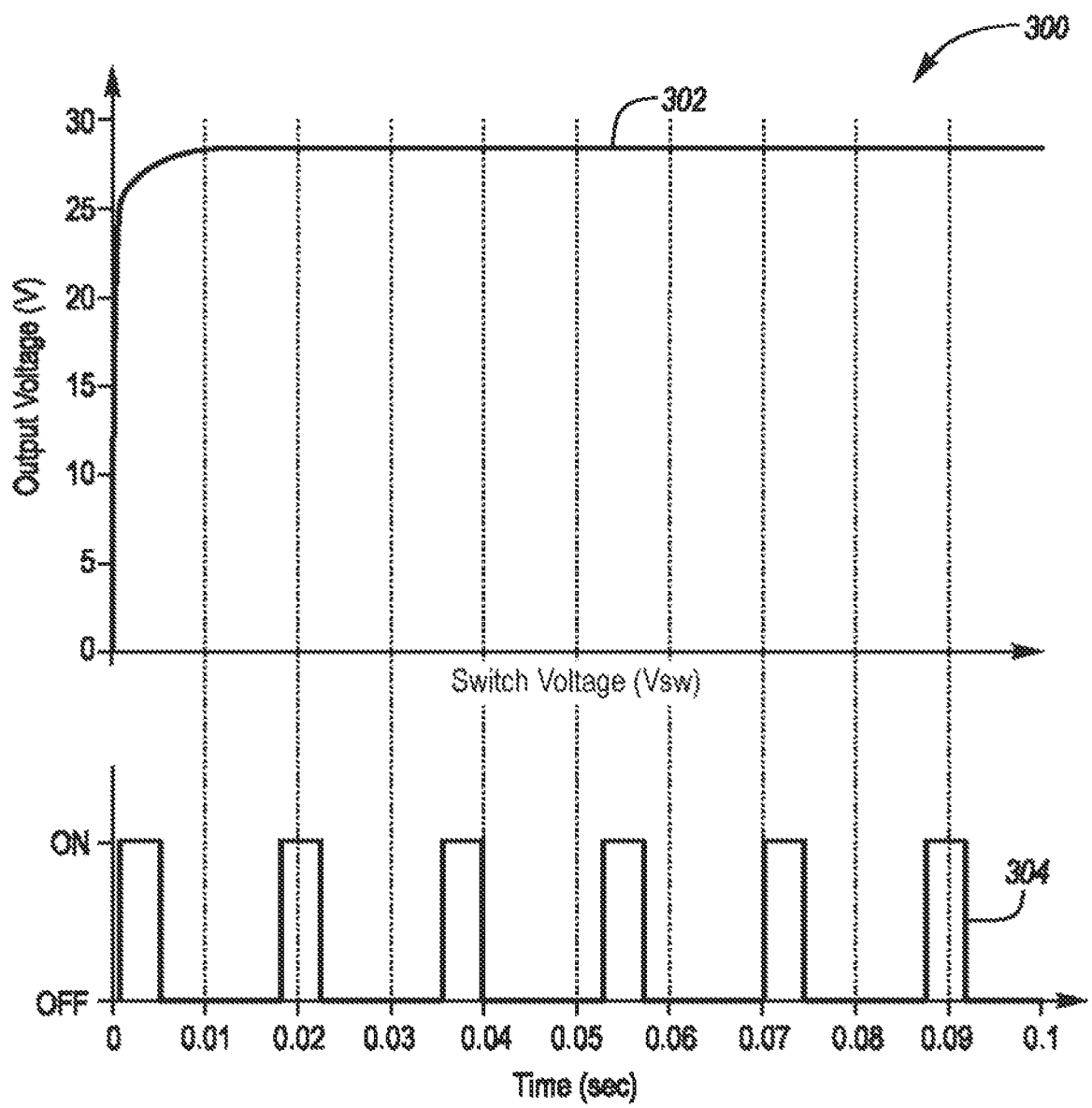
FIG. 4B depicts a pulse width modulation scheme for direct current.

Referring to FIGS. 4A-B, switching scheme 200, 300 for converter switches 134, is shown. The controller 136 controls the switches 134 according to a pulse width modulation signal 202 such that the output 204 is an alternating current signal. It should be appreciated that the pulse width modulation signal 202 may be shown as consolidated between multiple corresponding switches 134 such that the pair of corresponding switches has a resulting signal 202, as shown. Accordingly, the controller 136 may control actuation of the switches 134 as known in the art to produce an alternating current signal. Similarly, the controller 136 may operate the switches 134 to produce a DC signal with a requested output voltage.

Figure 5A:
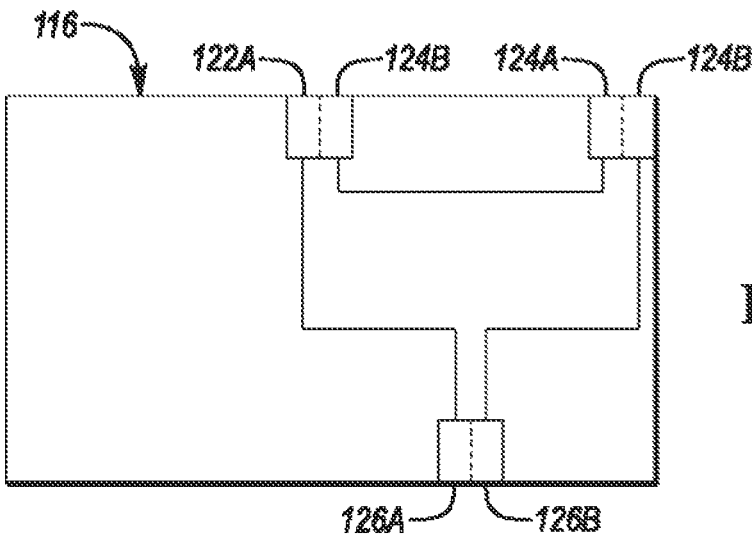
FIG. 5A is a schematic for an outlet connected to sockets connected in series.
Figure 5B:
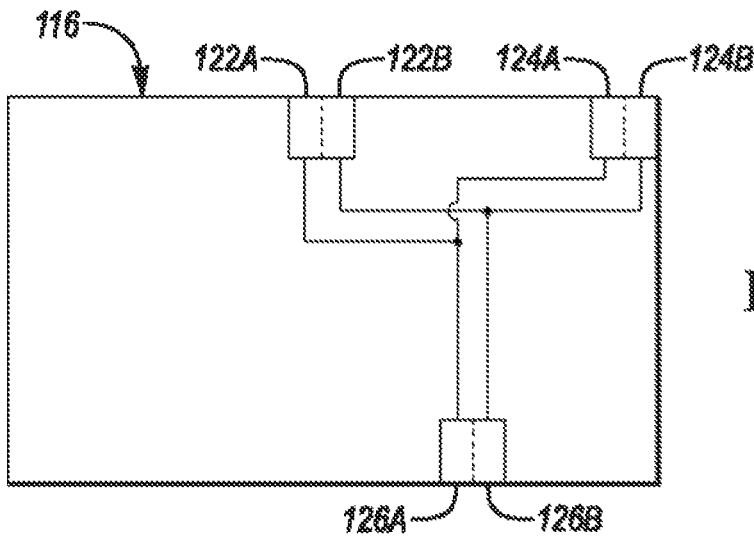
FIG. 5B is a schematic for an outlet connected to sockets connected in parallel.
Figure 5C:
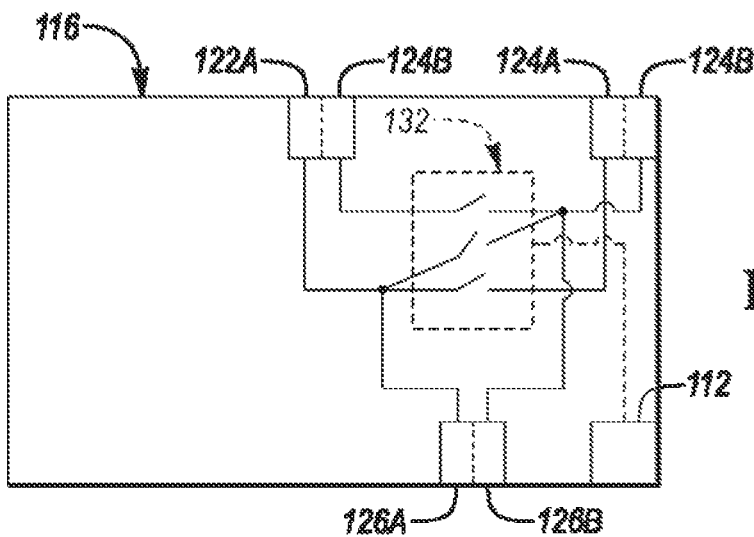
FIG. 5C is a schematic for an outlet connected to configurable sockets.

Referring to FIGS. 5A-C, a schematic of non-limiting examples of panel 116 configurations are shown. FIG. 5A shows an internal wiring diagram that arranges the power terminals 122, 124 drawing power from the socket power terminals (not shown). The power terminals 122, 124 are connected in series with outlet 126. As shown, the negative lead 122A of power terminal 122 is connected with the negative lead 126A of outlet 126. The positive lead 122B of power terminal 122 is connected with the negative lead 124A of power terminal 124. The positive lead 124A of power terminal 124 is connected with the positive lead 126A of the outlet 126. Thus, the socket connections via power terminals 122, 124 are connected in series. It should be appreciated that different phase leads of power terminals 122, 124 may be similarly connected in series when the phases are aligned.

FIG. 5B shows an internal wiring diagram that arranges the power terminals 122, 124 drawing power from the socket power terminals (not shown). The power terminals 122, 124 are connected in parallel with outlet 126. As shown, the negative lead 122A of power terminal 122 is connected with the negative lead 124A of power terminal 124 and negative lead 126A of outlet 126. The positive lead 122B of power terminal 122 is connected with the positive lead 124B of power terminal 124 and positive lead 126B of outlet 126. Thus, the socket connections via power terminals 122, 124 are connected in parallel. It should be appreciated that different phase leads of power terminals 122, 124 may be similarly connected in parallel when the phases are aligned.

FIG. 5C depicts controller 112 being configured to rearrange the connections of power terminals 122, 124 and outlet 126 such that the power terminals 122, 124 can be in series or parallel with the outlet 126 upon demand. The controller may be further configured to isolate the power terminals 122, 124 such that each power terminal is associated with a specific outlet 125, 126 (not shown). The controller 112 may configure the switches and circuitry 132 upon command by the converter controller 136. The converter controller 136 may reach maximum power, voltage, or current limits on one of the pairs of switches 134 and request a change in configuration by controller 112. As discussed, the communications may be provided via communications terminals 128, 130 or other sources.

Figure 6:
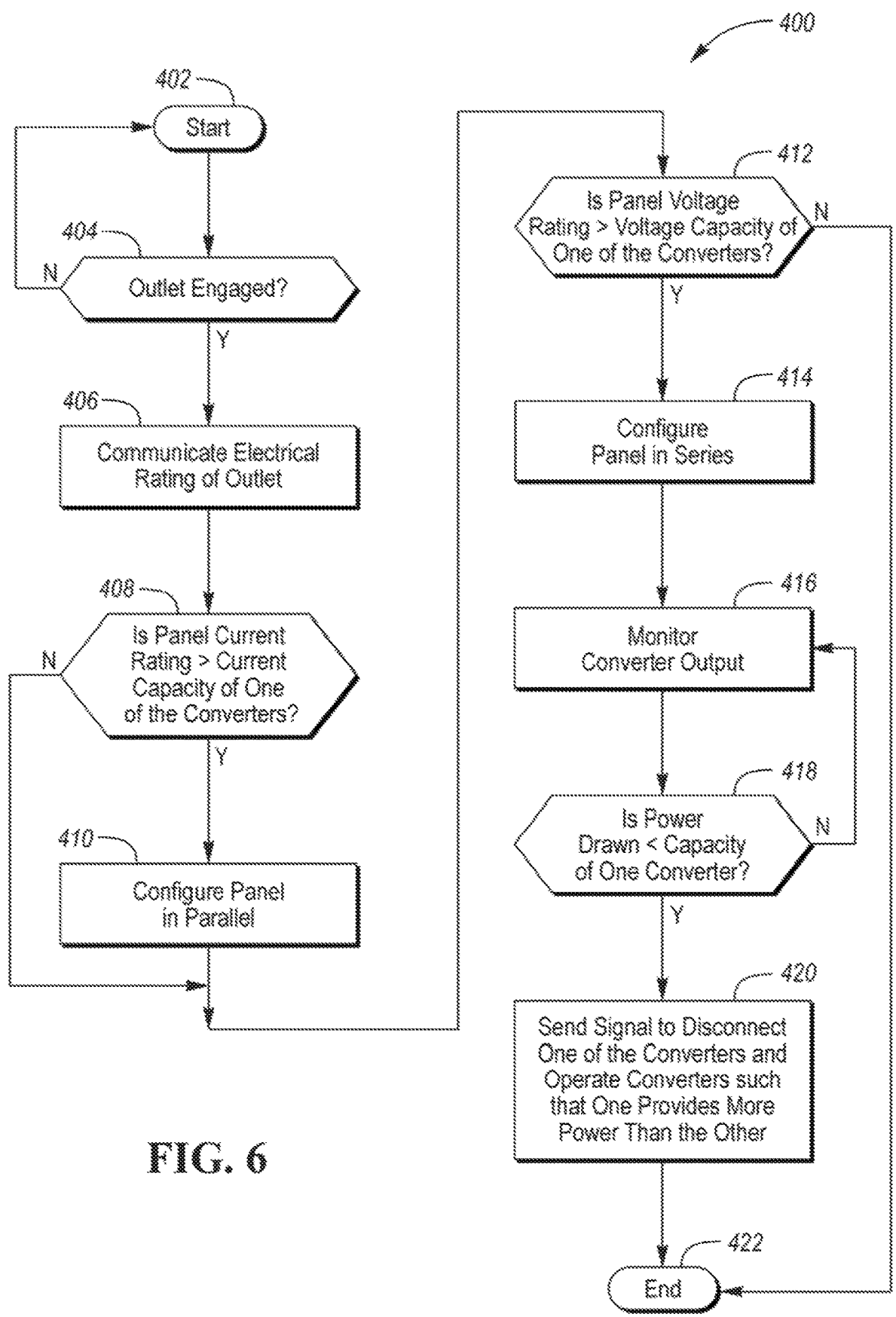
FIG. 6 is an algorithm performing some of the steps of this disclosure.

Referring to FIG. 6, an algorithm 400 is shown. The algorithm 400 starts in step 402. The algorithm 400 may include additional steps or omit steps. The steps may be organized in a different order or be executed by a controller at the same time. Any of the controllers 112, 136 may be employed to perform any or all of the steps. In step 404, the controller determines whether the outlet is engaged. Such engagement may be determined through a variety of means (e.g., resistance sensing, communications).

In step 406, the electrical rating of the outlet is communicated to the converters 102, 104. In step 408, if the panel current rating is higher than the one of the power converters 102, 104 satisfying the load, the panel may be configured in parallel (FIG. 5B) in order to operate both converters 102, 104 or switches 134 therein to provide the necessary current. Similarly, in step 412 if the panel voltage rating received is more than the one of the converters 102, 104 engaged, the controllers 112, 136 may configure the terminals 122, 125 in series to provide the necessary voltage.

In step 416, the power converters 102, 104 are operated commensurate with a load of the outlet 126. That is, voltage and current may be properly generated via the switches 134 based on power factor or other factors (e.g., voltage) to ensure the load is properly satisfied. The production of electricity may be managed to ensure that only the power converters 102, 104 or switches 134 necessary are used. For example, if total current drawn is less current production for one of the converters 102, 104, in step 418, the controller may send a signal to the other controller 112 to disconnected one of the converters and operate the converters 102, 104 such that one provides more of the power than the other or all of the power. In step 422, the algorithm 400 ends or repeats.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a pair of power converters;
   a socket including an array of power terminals arranged to accept outlets of different power terminal configurations to interconnect the pair of power converters therewith; and
   a panel including
      a controller configured to,
         responsive to detecting panel and socket engagement, communicate an electrical rating of an outlet via the socket to define a switching scheme for the pair of power converters, and
         responsive to indication that one of the power converters has capacity to exclusively satisfy the electrical rating of the outlet, disconnect the other of the power converters from the outlet.

2. The vehicle of claim 1, wherein the panel further includes circuitry to change an electrical connection of the pair of power converters between series and parallel.

3. The vehicle of claim 1, wherein socket and panel each include a communications terminal.

4. The vehicle of claim 1, wherein the panel further includes circuitry configured to electrically connect the pair of power converters in series.

5. The vehicle of claim 1, wherein the panel further includes circuitry configured to electrically connect the pair of power converters in parallel.

6. The vehicle of claim 1, wherein the power converters are inverters, transformers, or voltage regulators.

7. A vehicle comprising:
   a socket including an array of power terminals arranged to accept outlets of different power terminal configurations to interconnect power converters therewith;
   a panel including an outlet engaged with the socket; and
   a controller configured to,
      responsive to detecting engagement of the panel and power converters, operate the power converters commensurate with a load of the outlet such that the load is satisfied with power from both of the power converters, with one of the power converters providing more power than the other of the power converters.

8. The vehicle of claim 7, wherein the panel further includes circuitry to change an electrical connection of the power converters between series and parallel.

9. The vehicle of claim 7, wherein socket and panel each include a communications terminal.

10. The vehicle of claim 7, wherein the panel further includes circuitry configured to electrically connect the power converters in series.

11. The vehicle of claim 7, wherein the panel further includes circuitry configured to electrically connect the power converters in parallel.

12. The vehicle of claim 7, wherein the power converters are inverters, transformers, or voltage regulators.

13. A vehicle comprising:
   at least one power converter;
   a socket including an array of power terminals arranged to accept outlets of different power terminal configurations to interconnect the at least one power converter therewith, and
   a panel including an outlet engaged with the socket; and
   a controller configured to, responsive to detecting engagement of the panel and socket, communicate an electrical rating of the outlet such that the at least one power converter satisfies a load connected to the outlet, and responsive to indication that the one of the power converters has capacity to exclusively satisfy the electrical rating of the outlet, disconnect the other of the power converters from the outlet.

14. The vehicle of claim 13, wherein the panel further includes circuitry to change an electrical connection of the at least one power converter between series and parallel.

15. The vehicle of claim 13, wherein socket and panel each include a communications terminal.

16. The vehicle of claim 13, wherein the panel further includes circuitry configured to electrically connect the at least one power converter in series.

17. The vehicle of claim 13, wherein the panel further includes circuitry configured to electrically connect the at least one power converter in parallel.

18. The vehicle of claim 13, wherein the power converters are inverters, transformers, or voltage regulators.

* * * * *